Nov. 19, 1968  R. H. BLAKELEY ET AL  3,411,398
BLIND FASTENER
Filed March 30, 1967  2 Sheets-Sheet 1

INVENTOR
RICHARD H. BLAKELEY
PAUL HERNADI
BY Christie, Parker & Hale
ATTORNEYS

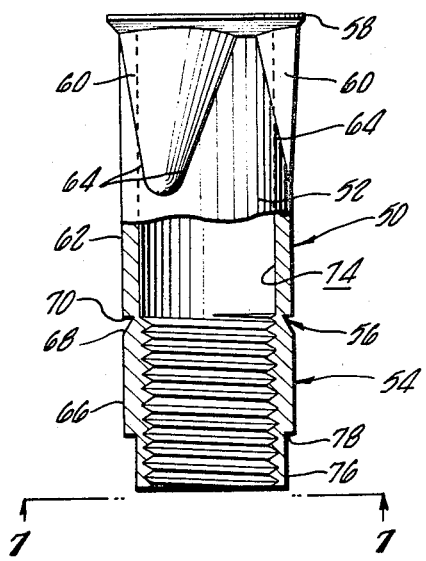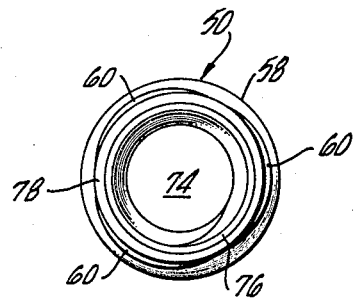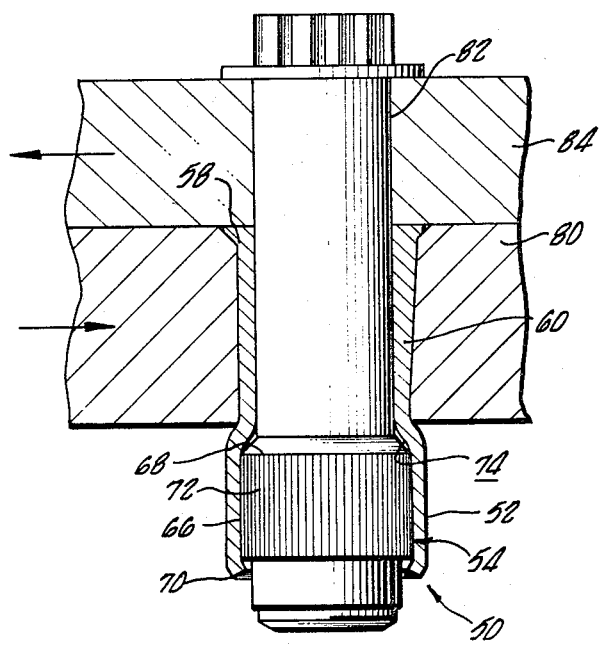

3,411,398
Patented Nov. 19, 1968

3,411,398
BLIND FASTENER
Richard H. Blakeley, Encino, and Paul Hernadi, Torrance, Calif., assignors to VSI Corporation, Pasadena, Calif., a corporation of Illinois
Continuation-in-part of application Ser. No. 539,182, Mar. 31, 1966. This application Mar. 30, 1967, Ser. No. 641,404
9 Claims. (Cl. 85—72)

ABSTRACT OF THE DISCLOSURE

An integrally formed fastener is defined by: a body, a nut forming portion, a breaking neck between the body and nut and a head. An externally threaded member may pass through a bore in the head and body, engage threads in the nut forming portion and apply a compressive stress on the breaking neck to fracture the neck and draw the nut into the body's bore. As the nut is drawn into the bore, it expands the body behind the sheet in which the fastener is to be set. The head and expanded body portions coact to retain the fastener in the sheet. The bore of the body and the major diameter of the nut's threads are equal. The diameter of the outer surface of the body and the major diameter of the nut are also equal. An alternate embodiment employs spaced-apart lobes disposed about the upper portion of the body adjacent the head. Each of the lobes is defined by a tapered, longitudinal, smooth surface which converges in the direction of the nut to meet the cylindrical body above the breaking neck. The lobes elastically deform the material surrounding the hole in which the fastener is set to increase fatigue strength.

*Cross reference to related application*

This is a continuation-in-part application of application Ser. No. 539,182, filed Mar. 31, 1966, now abandoned.

*Background of the invention*

This invention relates to blind fasteners in general and, more specifically, to improvements in blind fasteners of the one-piece type.

The prior art has introduced blind fasteners of many forms including those formed of multiple parts and those of the one-piece variety. Multi-piece, blind fasteners utilize a mandrel, bolt or screw which is positioned in a nut and rivet to hold the two together during installation into a performed hole. These fasteners require separate hand operations to assemble the rivet and nut on the mandrel prior to positioning in the hole. While multi-piece fasteners are extensively used, one-piece blind fasteners, in many applications, have supplanted or replaced them. One-piece blind fasteners are characterized by their ability to be inserted and used from one side of a workpiece without the necessity of holding the nut and rivet together through a mandrel or the like.

A one-piece blind fastener heretofore used employs a frangible section between its rivet or body and nut portions. The fastener has a large axial bore in its body through which a male threaded element may pass with considerable clearance between it and the bore defining walls of the body. The frangible section is defined by an annular, inwardly extending, radial wall at the end of the body. The nut is attached to the inner terminus of the body. The frangible wall for engagement by the male threaded member. The wall is designed to fracture upon the application of an axial, inward load applied by the male threaded element through the nut. The nut is frusto-conical shaped with its smallest section terminating at the frangible wall. The nut's conical surface is designed to be drawn into the body's bore and, after a limited amount of axial travel, engage the wall around the bore. In use, the fastener is inserted into a hole in a sheet of material. A bolt is inserted into the fastener with its threads engaged in the threads of the nut. Upon tightening of the screw, the nut is drawn into the bore of the rivet or body portion, breaking the wall in the process. The nut, as it is continuously drawn into the frangible bore of the body, engages and expands the walls of the rivet against the sides of the hole in the sheet. The fastener is then anchored.

This type of fastener, while overcoming many of the disadvantages of multi-part fasteners, has disadvantages of its own. Among these disadvantages is its weakness in shear. When set in a sheet, the threaded elements are at least partially within the hole in the sheet through which the fastener extends resulting in threads in bearing instead of bearing between two smooth surfaces. As is well known, the area available to resist shear is reduced when threads are in bearing because the area of contact between the threaded elements is smaller than between a smooth shank and a bore in fastener systems having the same element diameters. Another disadvantage is in the large bore within the rivet or body. When the fastener is installed, the bore is rarely completely filled by the nut resulting in a small area of contact between the nut and body for arresting shear forces. Moreover, this type of fastener has poor push-out characteristics in at least two respects. Initially, this type of fastener may rely on radial forces between the walls of the body or rivet and the sides of the hole in which it is anchored to resist push-out. The fastener, therefore, will be pushed out of its sheet upon the application of an axial load in either direction which is sufficient to overcome the radial constraint force. Secondly, and most important because of the tapered characteristics of the nut, the area of contact between it and the bore is low, allowing axial loads inwardly of the fastener to loosen the nut with respect to the surfaces of the bore of the rivet.

*Summary of the invention*

The above, as well as other problems, are overcome by the one-piece fastener of this invention.

Briefly, the improved fastener comprises a headed body having a cylindrical bore for the passage of an externally threaded member, such as a mandrel, screw, bolt or the like. The head is located at one end of the body and flares outwardly therefrom to provide a means for preventing axial displacement of the fastener. An axially aligned nut is located at the other end of and made integral with the body through a breaking neck. The nut has internal threads, which have major diameters essentially equal to the diameter of the body's bore, for engagement with the mandrel. The maximum diameter of the nut does not exceed the outside diameter of the body, but is larger than the diameter of the body's bore. The breaking neck is formed through an area of reduced axial cross section in the fastener between its body and nut such as is produced by a groove. The minimum internal diameter of the breaking neck is no less than the diameter of the bore while its maximum external diameter is no larger than the diameter of the body. The nut is preferably tapered from the breaking neck away from the body towards the nut's maximum dimension. The maximum diameter of the nut corresponds to a generally cylindrical midsection which, as previously stated, is limited in diameter to the diameter of the body. Preferably, an end section of smaller diameter is provided on the nut which meets the cylindrical section at a shoulder.

In preferred form, the outside diameter of the body and the maximum diameter of the nut are substantially the same, permitting formation of the one-piece fastener from tubular stock and requiring a minimum amount of shaping or machining as well as relatively small sheet holes. Serrations, knurling or the like are provided on the outer surface of the cylindrical section to prevent relative rotation between the nut and the body's bore when the nut is in its final position. It is also preferred practice to deform the lower end of the nut to form self-locking threads.

An alternate, preferred embodiment provides circumferentially disposed, tapered lobes on the outer surface of the body. The lobes extend longitudinally from the head towards the nut with the taper converging towards the body in the direction of the nut to meet the cylindrical portion of the body intermediate the head and the breaking neck. The surfaces of the lobes are smooth to prevent stress concentrations in the fastener and the sheet in which the fastener is installed.

To install the fastener in a sheet, a hole is drilled in the sheet and the fastener inserted in the hole. The threads of a mandrel are engaged in the threads of the nut and the mandrel tightened. When sufficient axial stress is produced in the breaking neck, it fails, allowing the nut to be drawn into the bore of the body. As the nut is drawn into the bore, the body expands behind the sheet to accommodate the outer dimensions of the nut. The nut is drawn inwardly until the shoulder is well within the body's bore, whereupon the mandrel is withdrawn. Because of the elasticity of the body, it will contract in back of the shoulder preventing the nut from being pushed out of the body's bore. The fastener is then anchored to its sheet. When it is desired to attach a second sheet to the first sheet, all that is necessary is to insert an appropriate size threaded member through a hole in the sheet to be attached and engage the member in the nut. The fastener can, of course, be used to clamp two sheets without the necessity of the threaded member.

The embodiment of the fastener which employs tapered lobes is installed in the same manner as described above, except that the lobes are in interference engagement with the wall of the hole of the sheet in which it is placed. The lobes are preferably configured or sized to elastically prestress the wall in the vicinity of the head to increase torque-out resistance of the fastener and fatigue strength in the region of the sheet where this type of stress most often leads to sheet failure.

The one-piece, blind fastener of the present invention has many advantages over previously known fasteners which makes it particularly suitable in applications where high load conditions must be met. Initially, the fastener has considerable strength in shear because the fastener is set with its nut portion behind a sheet. By having the nut behind the sheet, the male threaded element used may have a smooth shank in the bore of the body which increases the area available to resist shear loading over the type of fastener which requires threaded elements between the two sides of its retaining sheet. In short, the fastener of this invention may be used without threads in bearing. In addition, the shank of the male element and the bore of the body can coact along the entire length of the body to resist shear, whereas the fastener which has its nut drawn into the body's bore to expand the body against the hole in which the fastener resides must rely upon the area of contact between the nut and the bore to resist shear. This area is often small because the nut does not fill the bore. An additional advantage of the present fastener inures from the close fit between the male element's shank and the bore of the body. The bore is preferably substantially equal in diameter to the major diameter of the nut's threads and the diameter of the shank. This results in very little movement between attached sheets when displacement forces acting in opposite directions on the sheets and normal to the axis of the fastener are experienced. Push-out resistance of the inventive fastener is excellent because the fastener relies on its head and expanded body portion to resist axial loading. The sheet is interposed between the expanded body and head which requires an axial load sufficient to cause the failure of one or the other of the restraining elements before push-out occurs. The axial load required to produce failure of the present fastener is considerably greater than the load required to push out a fastener which relies solely on radial forces between the wall of the hole in which it is set and the fastener. Push-out resistance is considerably greater with the head-expanded portion restraint than the conical nut fastener previously discussed because the resistance to push-out of the latter type fastener also depends on the small area of engagement between the nut's conical surface and bore.

Additional features of the present fastener include the shoulder between the major diameter mid-portion and end portion of the nut, serrated mid-portion and deformed threads. The shoulder provides a space for contraction of body material in behind the mid-portion to increase the axial strength of the fastener. The serrated mid-portion aids in setting the nut within the bore by resisting torsionally induced slipping between the bore and nut. The deformed threads provide a locking feature between a male threaded element and the nut.

Another significant feature of the present invention lies in the breaking neck. The breaking neck does not dictate unfavorable fastener geometry because it is limited in dimension to a diameter no larger than the diameter of the body and no smaller than the diameter of the bore. These dimensional limitations allow the fastener to have maximum bore and body diameters dictated by the diameter of the male threaded element to be used and not the element and the breaking neck as in the case with blind fasteners relying on radial forces between the body wall and sheet to keep them in place. The result is that much smaller sheet holes are required with the present fastener to accommodate a given sized male member and fastener combination.

The embodiment of the fastener employing tapered lobes increases the fatigue life of the sheet in which the fastener is set by elastically stressing the sheet in tension in the area where fatigue failure most often occurs: near the interface between two attached sheets. The lobed fastener also increases torsional resistance between the body and the sheet resulting in improved torque-out resistance. The space between adjacent lobes provides room for sheet material displaced by the lobes, thereby preventing excessive plastic deformation of the sheet. The lengthwise taper allows easy installation because of the gradual loading of hole and fastener material as the fastener is set in its supporting sheet. If the lobes were untapered, the setting of the fastener to provide an interference fit could require broaching of the sheet along the edges and length of the fastener's hole. The smooth periphery of the lobes avoids points or lines of high stress which would occur in the sheet and fastener if the lobes had a fine edge.

These and other advantages, aspects and features of the instant invention will become more apparent from the following description, appended claims and drawings.

*Brief description of the drawings*

FIGURE 6 is an elevational view of the embodiment of the invention having tapered lobes;

FIGURE 7 is a view taken along line 7—7 of FIGURE 6; and

FIGURE 8 is an elevational, sectional view of the fastener shown in FIGURES 6 and 7 as set in one of two sheets.

Description of the preferred embodiments

Figure 1:
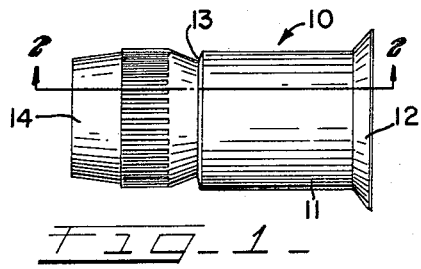
FIGURE 1 is a view of a preferred one-piece blind fastener of the present invention.

Referring now to FIGURE 1, reference numeral 10 indicates a preferred form of the one-piece, blind fastener of the present invention. Blind fastener 10 includes a body 11 having a head 12 disposed at one end and a breaking neck 13 at its opposite end. Nut 14 is integral with body 11 and extends away from breaking neck 13. Nut 14 has a maximum diameter approximately equal to but not larger than the diameter of the body 11 permitting the fastener to be manufactured from tubular metal stock and minimizing both external and internal machining.

Figure 2:
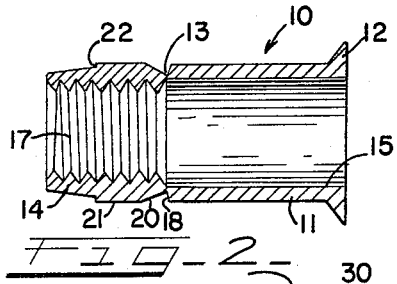
FIGURE 2 is a longitudinal cross-sectional view of the one-piece fastener of FIGURE 1 taken generally along the line 2—2 of FIGURE 1.
Figure 3:
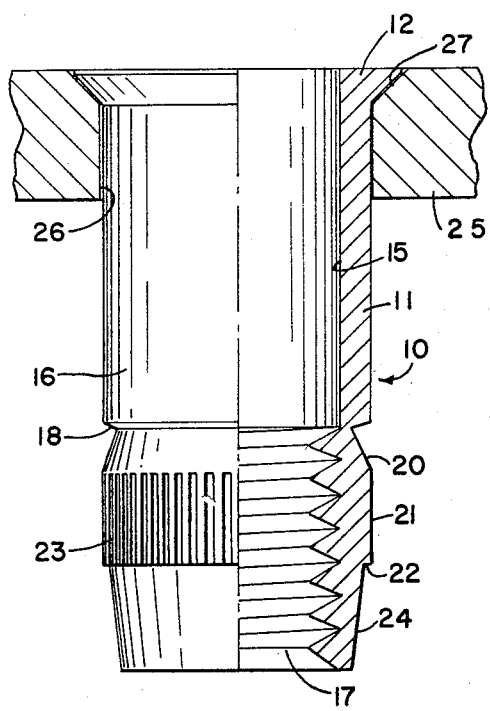
FIGURE 3 is an enlarged cross-sectional view of a workpiece with the one-piece fastener of FIGURE 1 installed and shown in half section.
Figure 4:
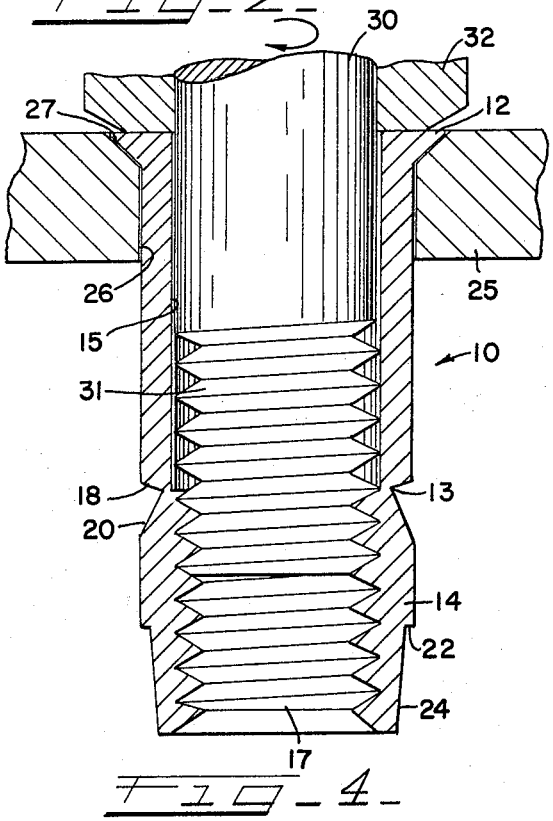
FIGURE 4 is an enlarged cross-sectional view similar to FIGURE 3 with the one-piece fastener of FIGURE 1 in the process of being set by a tool shown fragmentarily.

As seen in FIGURES 2 and 3, body 11 is provided with a cylindrical bore 15 of uniform diameter which extends from head 12 to breaking neck 13. The outer surface 16 of body 11 is also cylindrical and of uniform diameter from head 12 to a plane containing the breaking neck 13. The inner end of cylindrical bore 15 terminates at breaking neck 13 and merges into a threaded bore of 17 formed in nut 14. As is shown, the breaking neck is of reduced axial cross-sectional area relative to body 11 and nut 14. Threads 17 begin at breaking neck portion 13 and continue uniformly through nut forming portion 14. The diameter of bore 15 and the major diameter of the threads 31 of mandrel 30, shown in FIGURE 4, are preferably of substantially the same dimension to insure a minimum clearance between the unthreaded or shank portion of the externally threaded mandrel and the wall of the bore. By minimizing the clearance between these two members the shear properties of the fastener are enhanced because lateral forces on the mandrel do not result in sheet displacement.

The lower end of body 11 of fastener 10 is shown joined to the breaking neck 13 through a sharp, frustoconical shoulder 18. However, shoulder 18 does not have to be frusto-conical in configuration; it may be normal to the cylindrical axis of the fastener or have a variety of other surface configurations.

Nut 14 has an external, outwardly flaring surface 20 extending away from breaking neck 13 and terminating at a cylindrical or circumferential section 21. As is evident in the drawings, the smallest diameter of surface 20 is slightly greater than the inside diameter of cylindrical bore 15, but less than the diameter of body 11, thereby providing a thin wall section at breaking neck portion 13. A shoulder 22 is formed at the lower end of the circumferential section 21 and at the upper end of the end section 24. The shoulder provides a space for the body to tuck in behind section 21 and, as such, increases axial resistance to push-out.

A series of serrations or splines 23, which are generally parallel to the longitudinal axis of fastener 10, are formed on circumferential section 21 for reasons to become apparent. The lower section or end 24 of nut 14 may be shaped to a tapered configuration resulting in a reduced wall thickness adjacent the lower end of the threads 17. This configuration allows for easy deformation of these internal threads to provide a self-locking feature.

Figure 5:
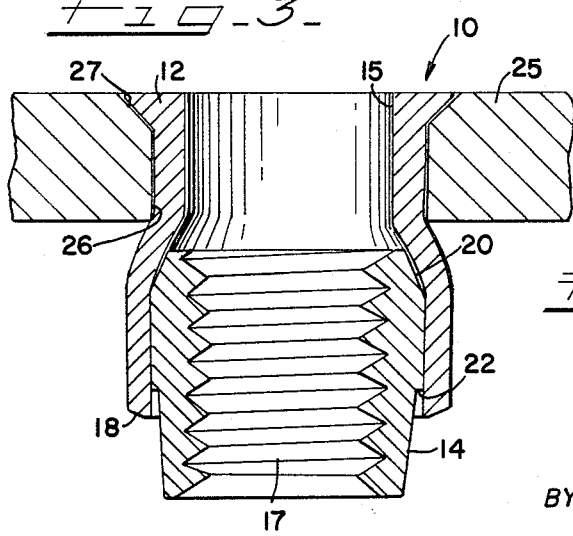
FIGURE 5 is an enlarged cross-sectional view of the blind fastener of FIGURES 1 through 4 after it has been set.

Referring now to FIGURES 3 through 5, the manner in which one-piece fastener 10 is set or installed will be described. A workpiece, sheet or metal plate stock, shown in cross section at 25, is provided with a preformed aperture 26 which is sized to receive cylindrical or circumferential section 16 on main body 11 of the fastener 10, preferably with a tight fit. In appropriate instances, bore 26 may be provided with a counterbored portion 27 to accommodate head portion 12 of the fastener 10 for flush mounting. It is obvious that other forms of heads other than the conical one shown may be used. The workpiece or plate 25 may be a single thickness or consist of several plates. In all cases, the thickness of plate 25 added to the axial length between breaking neck 13 and shoulder 22 should be less than the axial length of body 11 in order to permit shoulder 22 to enter bore 15 to set the fastener.

Typically, one-piece fastener 10 is positioned in opening 26 in plate 25 in the manner illustrated in the cross-sectional view of FIGURE 3. A setting tool (shown in part) of conventional form having a mandrel 30 is inserted through cylindrical bore 15 and rotated in the direction indicated by the arrow so that threads 31 on the mandrel 30 are engaged with threads 17 of the nut 14. An outer guide sleeve 32 may be provided on the setting tool to hold fastener 10 in opening 26 while mandrel 30 is rotated.

After full engagement with threads 17, mandrel 30 applies an axial force on nut 14 in the direction of head 15. Guide sleeve 32 engages head 12 of fastener 10 to resist this axial force with the result that nut 14 fractures breaking neck 13. Outwardly flaring surface 20 will then enter cylindrical bore 15 causing body 11 to radially expand. As axial movement of mandrel 30 continues, serrations 23 on cylindrical or circumferential section 21 are pulled within bore 15 plowing shallow, axial grooves in the inner wall of body 11 which are interfitted with the ridges or serrations 23 of nut 14. The lower end of body 11 of fastener 10 gradually expands until cylindrical portion 21 on nut 14 enters the bore 15.

When cylindrical section 21 is fully within body 11, the latter constricts radially inward of shoulder 22 due to the elasticity of the material. This permits the sharp corner formed by the intersection of shoulder 22 and cylindrical section 21 to dig into the now enlarged portion of bore 15. Accordingly, good resistance is provided against axial forces tending to push nut 14 from bore 15. The interlocking effect between the serrations and internal bore 15 is such that rotation of the nut relative to the body 11 is prevented. After a bolt, stud, screw or the like is inserted, further tightening of the stud merely causes nut 14 to wedge more tightly within the body 11.

As shown in FIGURE 5 in the finally installed position, the upper end of nut 14 is disposed below the underside of plate 25. Under no circumstance is it intended that nut 14 enter the undeformed portion of bore 15 which is positioned between the opposite faces of plate 25. A bolt, stud or screw with a portion of the shank unthreaded has its lower threaded end engaged with threads 17 while the unthreaded portion of the shank fills the undeformed part of the bore 15 to provide a solid section to resist shear forces.

It is to be appreciated that the disadvantages of the prior art forms described above are avoided by the present invention. The instant invention's novel design permits the fastener to be installed in a hole without first being assembled on a mandrel, bolt, stud or screw as in the case of multi-piece blind fasteners. The disadvantages of existing one-piece type blind fasteners enumerated above are avoided by the novel construction described through the novel shaping of the nut, the breaking neck, and their relation to body 11. The nut is securely locked against axial and rotational movement within bore 15 of body 11 after it has been set.

The increase in shear resistance, produced by having its bolt's threads non-bearing and the shank of the bolt in substantially diametrical occupation of the bore, makes the present fastener suitable for aeronautical and space applications. In addition, the unique design permits one-piece fastener 10 to be formed from tubular metal stock with a minimum amount of cutting and machining since the outside diameter of nut 14 is substantially identical to that of body 11. Due to the uniqueness of breaking neck 13 there is no need to provide a radial wall to joint nut 14 to body 11 as in prior art types.

FIGURES 6 through 8 show a modified form of the present invention which employs circumferentially disposed, spaced-apart and tapered lobes to increase fatigue life of the substructure in which the fastener is set and to resist torsional forces tending to loosen the fastener from its sheet.

Fastener 50 generally comprises a body 52, a nut forming portion 54, and a breaking neck 56 which joins the nut forming portion and body. Head 58 is on one end of body 52 to restrain the fastener in the substructure in which it is set. Lobes 60 are disposed on outer cylindrical surface 62 of body 52. Each lobe has a tapered surface which converges from head 58 towards nut 54 for intersection with cylindrical surface 62, intermediate head 58 and breaking neck 56. Thus, converging lines 64 are defined by the intersection of each of the lobes with surface 62. The longitudinal or lengthwise taper of each of the lobes converges from a point of maximum radial dimension at its intersection with head 58 to its meeting with surface 62. The lobes are spaced apart to provide space between them for elastic displacement of fastener and substructure material occasioned by the setting of the fastener. The longitudinal taper insures against broaching or cutting substructure material when the fastener is set. The peripheral surface of each of the lobes is smooth to prevent localized areas of high stress which would be the product of a sharp-edged surface.

The remaining portions of the fastener are similar to those portions previously discussed. Thus, nut forming portion 54 has a cylindrical midsection 66 which does not exceed in dimension the diameter of cylindrical surface 62. Frusto-conical section 68 converges from mid-portion 66 to breaking neck 56. In this embodiment, body 52 meets breaking neck 56 at annular shoulder 70 which lies in a plane normal to the axis of the fastener. Serrations 72 are disposed about midsection 66 to provide against rotation of nut forming portion 54 in bore 74 of body 52 when the fastener is being set. End portion 76 joins mid-portion 66 through right angle shoulder 78 to provide a space for the body to elastically contract behind the mid-portion when the nut forming portion is drawn into bore 74.

FIGURE 8 shows the lobed fastener 50 as it would be typically set in substructure 80 and employed with male threaded element 82 to hold sheet 84 and sheet 80 together. As in the previously described embodiment, body 52 expands radially outward on the blind side of sheet 80 to provide axial constraint and cooperates with head 58 to maintain the fastener in substructure 80. In this disposition, nut forming portion 54 is drawn into bore 74 where serrations 72 cut into the inner surface of body 52.

When forces are applied to sheets 80 and 84 in opposite directions, as shown by the arrows in FIGURE 8, male element 82 must transmit the resultant shear force to the holes in which it and fastener are disposed. With cyclic or repetitive shear loading having these force components, the substructure material of sheet 80 proximate the interface or faying surface between sheets 80 and 84 will fail in fatigue before the remaining portion of the substructure. In all practical applications the hole in sheet 80 is cylindrical. The fastener's cylindrical surface 62 is sized for a very close fit in this cylindrical hole. Lobes 60, therefore, engage the walls of the hole with an interference fit. When the fastener is set, the cylindrical walls of the hole will be deformed. Displaced material from this deformation will flow into the space between the lobes. The resultant stress produced by the engagement of the lobes 60 with the walls of the hole preloads these walls in tension, thereby increasing the fatigue strength of substructure 80, and deforms the hole such that torque-out resistance is imparted. Inasmuch as the fatigue strength of the substructure in which the fastener is mounted is increased at the fraying surfaces, interference engagement between the lobes and the substructure along the entire length of the hole may progressively diminish as design shear load decreases along this length. This fact allows the formation of the lobes with a longitudinal taper for ease in setting the fastener with the taper. The lobes' interference with the walls of the hole in which they are placed is gradually applied thereby eliminating boaching, cutting or unnecessary permanent deformation of the walls.

While elastic deformation of substructure surrounding a sheet's hole by the fastener's lobes is desirable, plastic deformation may be tolerated to the extent that the substructure will not crack.

Upon consideration of the foregoing, it will become obvious to those skilled in the art that various modifications may be made without departing from the invention embodied herein. Therefore, only such limitations should be imposed as are indicated by the spirit and scope of the appended claims.

What is claimed is:

1. An integrally formed, one-piece blind fastener comprising:
   (a) a cylindrical body having an axially disposed, cylindrical bore therethrough;
   (b) a head integral with the body at one end thereof and having a greater radial dimension than the body, the bore extending through the head;
   (c) a nut integrally connected to the body through a breaking neck, the nut having
      (i) a cylindrical section of a diameter substantially equal to the diameter of the body,
      (ii) an internally threaded bore coaxial with and merging into the bore of the body, the major thread diameter of the threaded bore being substantially equal to the diameter of the body's bore; and
      (iii) a frusto-conical section between the cylindrical section and the body, the body being integrally connected to the nut at the frusto-conical section's smallest diameter, the frusto-conical section increasing in diameter from its juncture with the body to the cylindrical section to form a conical surface which enables the nut to telescope into the body's bore, the smallest diameter of the frusto-conical section being greater thcan the diameter of the bore and less than the diameter of the body next adjacent to such smallest diameter, the breaking neck being defined by the cross-sectional area between the smallest frusto-conical section diameter and the bore; and
   (d) a plurality of circumferentially disposed, spaced apart and tapered lobes on the body extending from the head towards the nut, the lobes having an external surface which is smooth and convexly curved in a transverse direction to elastically deform the material of the substructure in which the fastener is set, the taper of each lobe being such that the lobes end at the body above the breaking neck and describe at their intersection with the body two lines which converge from the head towards the nut.

2. The blind fastener claimed in claim 1 wherein:
   the tapered lobes end on the body intermediate the breaking neck and the head.

3. An integrally formed, one-piece blind fastener comprising:
   (a) a cylindrical body having an axially disposed cylindrical bore therethrough;
   (a) a head integral with the body at one end thereof and having a greater radial dimension than the body, the bore extending through the head; and
   (c) a nut integrally connected through a breaking neck to the body opposite the head, the nut being axially aligned with the body and having
      (i) a cylindrical midsection of a diameter substantially equal to the outside diameter of the body, the cylindrical midsection having means to engage the wall of the body's bore to prevent rotation of the nut relative to the body when the nut is within the bore,
      (ii) an internally threaded bore coaxial with and merging into the bore of the body at the breaking neck, the major thread diameter of the threaded bore being substantially equal to the diameter of the body's bore, (iii) a circumferentially continuous end section outside the cylindrical midsection having a diameter less than the diameter of such midsection and means for providing a thread lock between the threads of the internally threaded bore and the threads of a male threaded member, the end section meeting the midsection at a shoulder, and (iv) a frusto-conical section between the midsection and the body, the nut being integrally connected to the body at the frusto-conical section's smallest diameter, the frusto-conical section diverging from its connection with the body to the midsection to form a conical surface which enables the nut to telescope into the body's bore, the smallest diameter of the frusto-conical section being greater than the diameter of the bore and less than the diameter of the body;

(d) the breaking neck being at the juncture of the body and the nut and having (i) a cross-sectional area normal to the longitudinal axis of the fastener less than the cross-sectional area of the body and nut normal to such axis and adjacent the breaking neck, and (ii) an interior diameter not less than the diameter of the bore and an external diameter defined by the smallest diameter of the frusto-conical section.

4. The fastener claimed in claim 3 including a plurality of cricumferentially disposed and spaced-apart lobes on the body extending from the head towards the nut, the lobes having an external surface which is smooth and convexly curved in a transverse direction to elastically deform the material of the substructure in which the fastener is set proximate the upper surface of such substructure.

5. The blind fastener claimed in claim 4 wherein each of the lobes has a tapered outer surface extending longitudinally from the head towards the nut, the taper of each of such surfaces being such that the lobes end at the body above the breaking neck and describe at their intersection with the body two lines which converge from the head towards the nut.

6. The blind fastener claimed in claim 5 wherein the tapered lobes end on the body intermediate the breaking neck and the head.

7. The blind fastener claimed in claim 6 wherein the tapered lobes have a maximum radial dimension measured from the longitudinal axis of the body less than the maximum radial dimension of the head measured from such axis.

8. The blind fastener claimed in claim 3 wherein the nut's end section is slightly tapered, the taper diverging towards the midsection.

9. An integrally formed, one-piece blind fastener comprising:

(a) a cylindrical body having an axially disposed cylindrical bore therethrough;

(b) a head integral with the body at one end thereof and having a greater radial dimension than the body, the bore extending through the head; and (c) a nut integrally connected through a breaking neck to the body opposite the head, the nut being axially aligned with the body and having (i) a cylindrical midsection of a diameter substantially equal to the outside diameter of the body, the cylindrical midsection having means to engage the wall of the body's bore to prevent rotation of the nut relative to the body when the nut is within the bore, (ii) an internally threaded bore coaxial with and merging into the bore of the body at the breaking neck, the major thread diameter of the threaded bore being substantially equal to the diameter of the body's bore, (iii) a tapered end section outside the cylindrical midsection having a diameter less than the diameter of such midsection and a plurality of the bore's internal threads, the end section meeting the midsection at a shoulder with the taper diverging towards the cylindrical midsection, and (iv) a frusto-conical section between the midsection and the body, the nut being integrally connected to the body at the frusto-conical section's smallest diameter, the frusto-conical section diverging from its connection with the body to the midsection to form a conical surface which enables the nut to telescope into the body's bore, the smallest diameter of the frusto-conical section being greater than the diameter of the bore and less than the diameter of the body;

(d) the breaking neck being at the juncture of the body and the nut and having (i) a cross-sectional area normal to the longitudinal axis of the fastener less than the cross-sectional area of the body and nut normal to such axis and adjacent the breaking neck, and (ii) an interior diameter not less than the diameter of the bore and an external diameter defined by the smallest diameter of the frusto-conical section.

References Cited

UNITED STATES PATENTS

| | | | |
|---|---|---|---|
| 2,296,470 | 9/1942 | Keehn | 85—75 |
| 2,726,569 | 12/1955 | Penman | 85—83 |
| 2,959,999 | 11/1960 | Wing | 85—75 |
| 3,078,002 | 2/1963 | Rodgers | 85—72 |
| 3,216,304 | 11/1965 | James et al. | 85—72 |

FOREIGN PATENTS

| | | |
|---|---|---|
| 1,309,246 | 9/1962 | France. |

EDWARD C. ALLEN, *Primary Examiner.*